Figure 1:
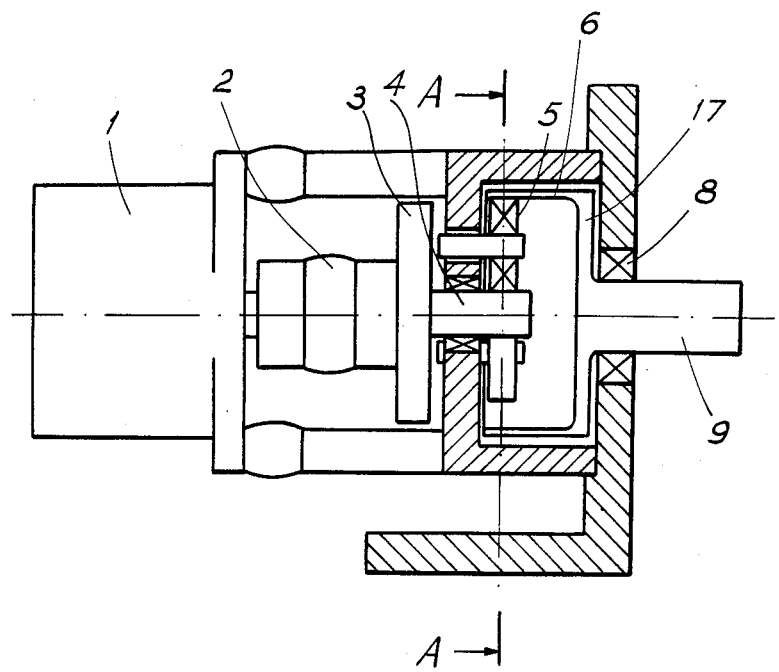

United States Patent [19]

Kinanen et al.

[11] Patent Number: 4,691,595
[45] Date of Patent: Sep. 8, 1987

[54] PLANETARY TRANSMISSION BASED ON FRICTION

[75] Inventors: Ilmari Kinanen, Espoo; Sulo Ranne, Helsinki, both of Finland

[73] Assignee: Orion-yhtyma Oy, Helsinki, Finland

[21] Appl. No.: 794,580

[22] Filed: Nov. 4, 1985

[30] Foreign Application Priority Data

Nov. 16, 1984 [FI] Finland .................................. 844519

[51] Int. Cl.$^4$ ........................ F16H 13/06; F16H 13/10
[52] U.S. Cl. ........................................ 74/798; 74/212
[58] Field of Search ................. 74/798, 212, 206, 202, 74/412 TA

[56] References Cited

U.S. PATENT DOCUMENTS

| | | |
|---|---|---|
| 1,190,662 | 7/1916 | Matteucci ............................. 74/798 |
| 3,304,809 | 2/1967 | Hellen .................................. 74/798 |
| 3,364,761 | 1/1968 | Nasvytis ............................ 74/798 X |
| 4,059,030 | 11/1977 | Gosting et al. ....................... 74/798 |

FOREIGN PATENT DOCUMENTS

| | | |
|---|---|---|
| 239855 | 6/1910 | Fed. Rep. of Germany ........ 74/798 |
| 0143651 | 9/1980 | German Democratic Rep. ... 74/798 |
| 0099549 | 6/1983 | Japan .................................... 74/798 |
| 45462 | of 0000 | Sweden ................................ 74/798 |

Primary Examiner—Leslie Braun
Assistant Examiner—D. Wright
Attorney, Agent, or Firm—Ladas & Parry

[57] ABSTRACT

A friction planetary transmission has a sun roller planetary roller and an elastically deformable outer periphery. The planetary rollers are attached to shafts which have a limited amount of radial movement. The outer periphery deforms to exert a frictional contact pressure on the planetary rollers such that a torque can be transmitted. The torque is adjustable by a circular disk which fits inside the outer periphery to regulate the amount of deformation. The circular disk can be moved axially to adjust the torque.

2 Claims, 5 Drawing Figures

B-B

PLANETARY TRANSMISSION BASED ON FRICTION

The object of invention is a planetary transmission. The contact stresses and the slipping value of the transmitted torque are adjustable by means of the elastic construction of the periphery.

In the transmission of rotary motion by toothed gearing and by chain drives etc. a periodic change in the velocity ratio occurs as a result of the displacement of the point of contact on the rolling path. This together with backlash causes vibrations in the motion which are particularly troublesome in mechanisms which require precision, such as for example in X-ray tomography equipment.

In planetary transmissions based on friction it has been earlier known (c.f. for example EP Patent No. 3793 and DE application publication No. 3306998) for elastic elements to be arranged between the sun wheel and the surrounding freely-rotating rollers, by means of which elements the desired compressive force in a radial direction is obtained. These elements are formed of rings of U-shaped cross-section which when compressed in an axial direction expand radially into pressure contact with the freely-rotating rollers. Such intermediately located elements facilitate somewhat the assembly of the transmission in that a certain clearance in a radial direction can be present prior to assembly, but on the other hand the construction will contain numerous parts and will thus also be expensive.

In the publication GB No. 2064706 a method is described of regulating the transmitted torgue by means of the pressure exerted on the planetary rollers by a fixedly attached outer ring deformed under fluid pressure. Realized in this way the solution contains quite a large number of parts and is, moreover, intended primarily as a clutch.

The purpose of the present invention is accordingly to provide a planetary transmission of the afore-mentioned type which enables the compressive force to be maintained by the aid of elastic deformation in a radial direction and with a construction which is as simple as possible and easy to assemble. In order to achieve this it is characteristic of the invention that the outer ring (6) is formed by a cylinder open at its end and made of thin elastic material and that cylindrical rollers (5) are located at such a distance in the axial direction from the rigid part of said cylinder that the cylinder (6) can deform during rotation as a result of the pressure produced by said cylindrical rollers (5).

In the transmission mechanism according to the invention the intermediate rollers are formed for example by ball bearings and are attached in such a manner to their supporting plate that they float freely in a radial direction between the inner and outer peripheries but that the movement of the bearings in a tangential direction is prevented by a close fit so that the transmission is practically free of backlash. When the inner periphery is rotated the intermediate rollers transmit the motion to the outer periphery. The velocity ratio is the ratio of the diameters of the peripheries contacted by the intermediate rollers. The advantage of the construction is reliability and compactness and also the possibility of using even a smooth motor shaft directly as the inner periphery of the transmission. When a hard grade of metal, e.g. hardened steel, is used for the rolling peripheries and ball bearings as the intermediate rollers a durable construction is obtained which has a very high efficiency and low slip.

The transmission mechanism according to the invention can be applied e.g. between a motor and a power screw to obtain the required speed of linear motion or to replace belt or other friction transmissions with a more precise and compact construction.

A suitable driving torque is thus achieved by making the outer periphery thin and dimensioning it so that it presses the intermediate rollers against the inner periphery with a suitable force. Between the intermediate rollers the outer periphery deforms in an inward direction under the influence of elastic forces. The magnitude of the inward displacement can be controlled by additional rollers adjustable in a radial direction, in which case the tightening to which the outer periphery is subjected and thus the compressive force exerted on the intermediate rollers can be adjusted by moving said additional rollers.

A particularly advantageous adjustment of the compressive force can be achieved according to another embodiment of the invention for example by means of a disk located inside the elastic periphery and closely fitting the periphery and moveable in an axial direction. This disk supports the periphery preventing its deformation in an inward direction so that when the disk is located near the rolling path the compressive force is large and conversely. The adjustment of the compressive force and thus of the torque is according to the invention to be performed by means of a setting screw through the output shaft.

In applications requiring less precision rollers having a rubber or plastics covering can advantageously be employed as the intermediate rollers. In this case the requirements of dimensional accuracy are eased and low material wear is achieved.

In the following the invention is described in greater detail with reference to the accompanying figures.

In FIG. 1 the basic construction of the invention is shown from the side and with the transmission part sectioned.

Figure 2:
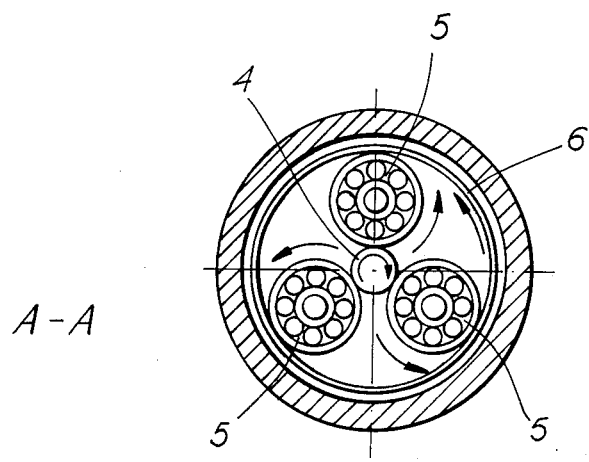

FIG. 2 shows a section through A—A of the previous figure.

Figure 3:
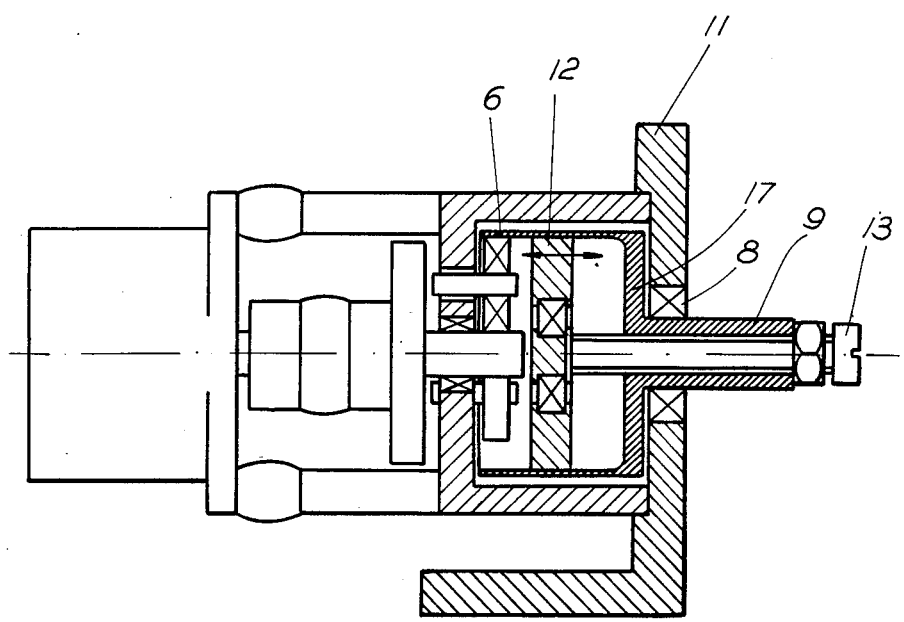

In FIG. 3 torque adjustment is arranged by means of a disk movable in an axial direction.

Figure 4:
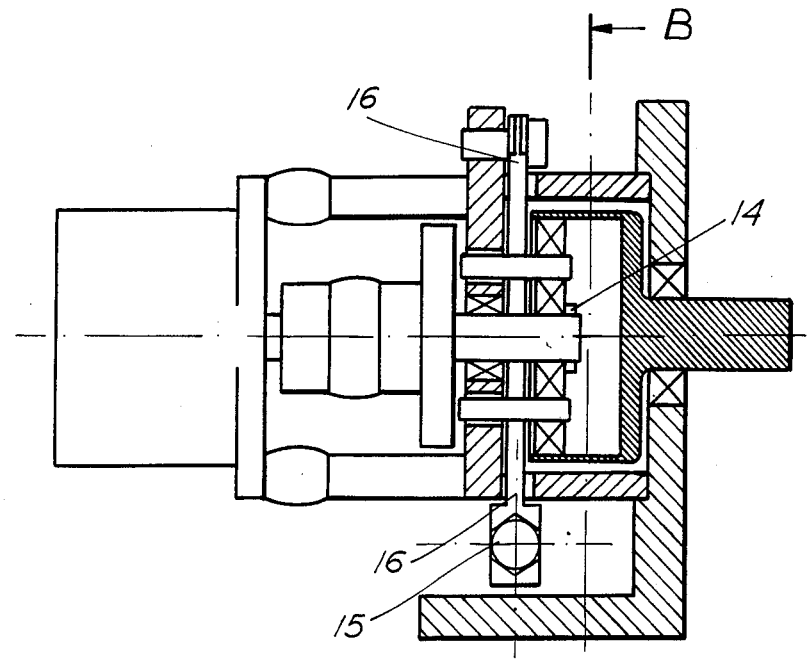

In FIG. 4 torque adjustment is arranged by means of tightening rollers movable in a radial direction.

Figure 5:
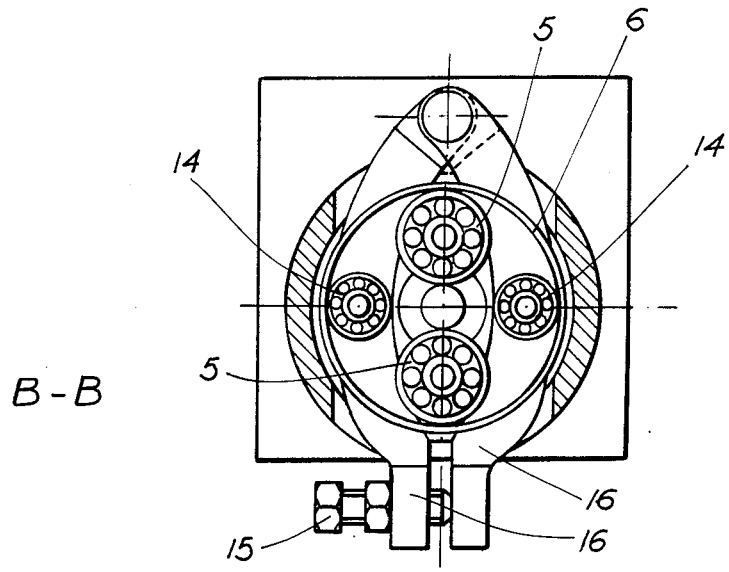

FIG. 5 shows a cross-section through B—B of FIG. 4.

FIG. 1 shows one embodiment of the invention with a stepping motor 1, an elastic coupling 2, a flywheel 3 and a driving roller 4. The intermediate rollers 5 are formed by bearings. If said bearings are three in number they are arranged symmetrically at the apices of an equilateral triangle. Said intermediate rollers are free to move in a radial direction under the pressure exerted by an elastic outer periphery 6. To the hub of the periphery 6 is attached a shaft 9 running in the bearing 8 having the same axis as the bearing 7 of the driving shaft 4. The outer periphery or cylinder 6 is of such a depth, i.e. the intermediate rollers 5 are at such a distance from the rigid part 17, that said periphery 6 can deform elastically in order to maintain a compressive force.

In FIG. 2 a working cross-sectionally diagram of the transmission is shown, sectioned through the intermediate rollers 5.

FIG. 3 shows an embodiment of the invention. A circular disk 12 is arranged inside the periphery and fitted so as to slide within the periphery supporting the periphery and preventing its deformation in an inward direction. A shaft 9 is carried by a bearing 8 in a supporting plate 11 covering the housing so that it is fully enclosed. By turning a screw 13 inside said shaft 9 the distance of said circular disk 12 from the bottom of the cup can be changed. When said disk is at the bottom of the cup the periphery 6 is relatively free to deform at its end and the compressive force on the intermediate rollers is small, whereas when the supporting disk 12 is adjusted by said screw to be near the intermediate rollers the deformation of the periphery is prevented and the compressive forces and thus the slipping torque are increased.

In FIG. 4 and in the cross-section from it in FIG. 5 an embodiment of the invention is shown in which the form of the elastic periphery 6 and thus the compressive force to which the intermediate rollers 5 are subjected is controlled by adjusting the distance between internal tensioning rollers 14 which bear against the ring 6. Said adjustment of distance is effected even during running by turning an external screw 15, whereby the rollers 14 are moved by rotation of levers 16 which are pivoted pliers-fashion. Said levers can also be double-armed and pivoted within the housing, in which case the screw 15 is arranged to pull the ends of the lever. The construction can also be closed.

We claim:

1. A friction based planetary transmission, which comprises a rotatable shaft, cylindrical rollers rotatably engaging the outer periphery of said rotatable shaft at at least two different positions, an outer peripheral member having an open tubular end portion surrounding said cylindrical rollers and engaging the rollers with its inner surface, said tubular portion being of thin elastic material and having an interference fit around the rollers in order to slightly deform during rotation thereof and thus to produce a pressure against the rollers, the outer peripheral member also including a central shaft portion connected to, or intergral with the tubular portion and extending away from the open end of the tubular portion, and a supporting disc positioned inside the tubular portion at an axially adjustable distance from the rollers towards the shaft portion of the peripheral member, said disc being closely fitted against the inner wall of the tubular portion in order to adjust the elasticity of the open end of the tubular member according to the axial position of the supporting disc.

2. A planetary transmission according to claim 1, wherein the supporting disc is rotatably fitted on a central shaft extending through the shaft portion of the peripheral member, said shaft being provided with means, such as threads, for adjusting the axial position of the supporting disc.

* * * * *